Aug. 8, 1950 J. T. KRAPP 2,518,026
COUPLING
Filed July 17, 1946
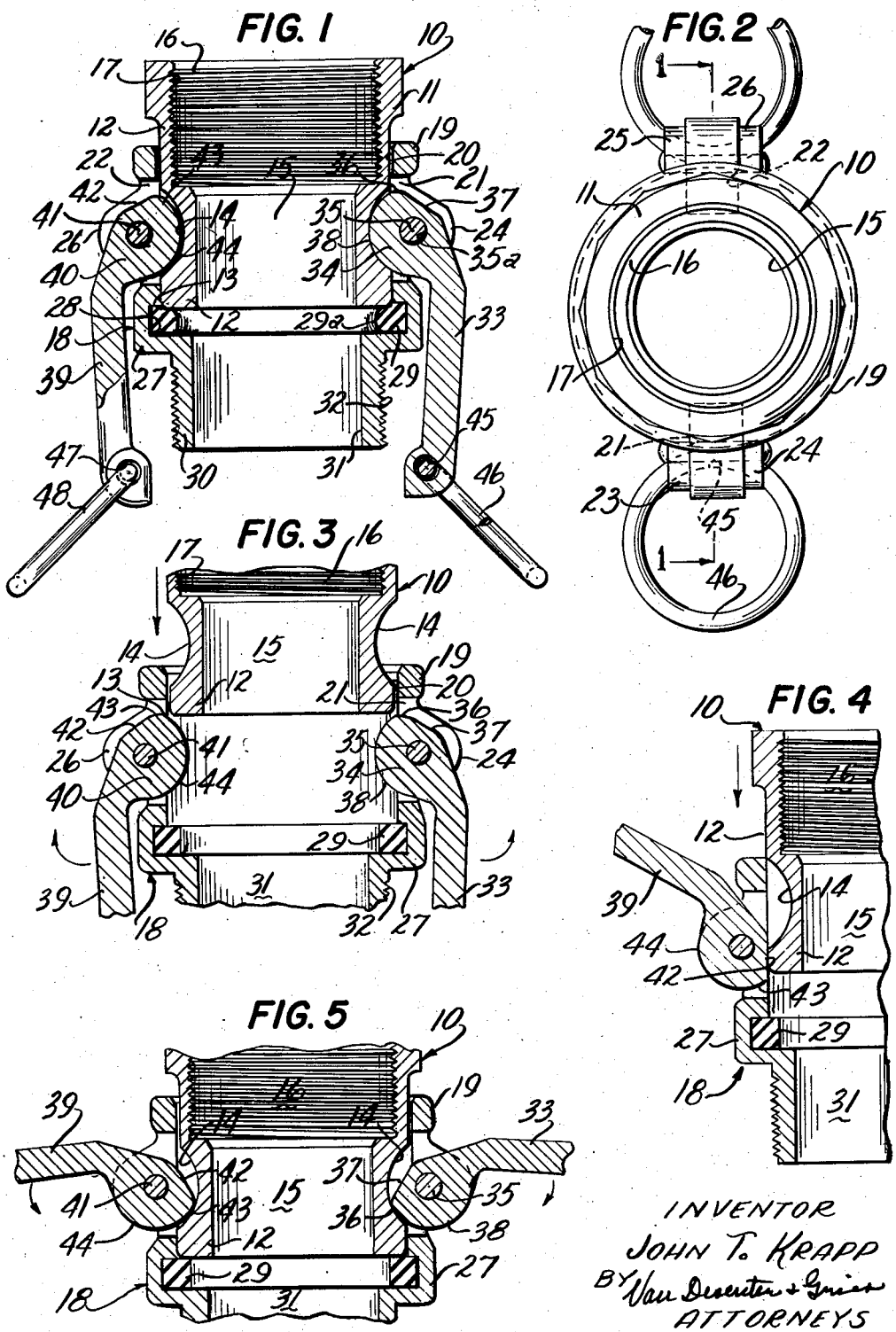
INVENTOR
JOHN T. KRAPP
BY Van Deventer & Grier
ATTORNEYS Patented Aug. 8, 1950

2,518,026

UNITED STATES PATENT OFFICE 2,518,026

COUPLING

John T. Krapp, Port Washington, N. Y.

Application July 17, 1946, Serial No. 684,233

1 Claim. (Cl. 285—171)

This invention relates to improvements in coupling devices suitable for coupling hose, conduits and the like, and has for an object the provision of a quickly attachable and quickly detachable coupling, which employs in a socket member cam means having surfaces adapted to be engaged by an insertable member as said insertable member is inserted for clearing a passage for the latter, and having other surfaces which engage said insertable member and may be manipulated to force it endwise therein against a seat in said socket member to effect a fluid tight seal therewith.

A further object of the invention is to provide a quickly attachable and quickly detachable coupling which includes a female or socket member carrying a seat with sealing means thereon, an insertable or male member having an annular surface adapted to be engaged by cam means in said socket member, said cam means being adapted to be manipulated for forcing said male member endwise against said seat, said cam means being first engaged by said male member when the latter is inserted and displaced from the path thereof, and having other portions of its surface adapted to engage said annular surface formed in said male member to effect said endwise movement and thereby establish a fluid tight seal between said members.

A still further object of the invention is the provision of a coupling capable of withstanding as great or greater pressure than that applied to the hose or conduit with which the coupling is used.

Other objects and advantages of the invention will be apparent to those skilled in the art from a study of the following specification and the accompanying drawings.

In the drawings, which are merely given by way of example to illustrate the invention:

Fig. 1 is a sectional elevation of my new and improved coupling;

Fig. 2 is a plan view of the coupling of Fig. 1, as seen from the upper end thereof;

Fig. 3 is a fragmentary view, showing the normal position of the cam means in the female or socket member of the coupling, and showing the male or plug member as it first contacts the cam when it is being inserted;

Fig. 4 is a fragmentary sectional view, showing the cam levers being cammed upwardly as the male member is pushed further into the socket member; and Fig. 5 is a fragmentary, sectional view, showing the end of the male member engaging the sealing means on the seat and showing the cams in position to force said member axially, thereby compressing said sealing means and effecting a fluid tight seal when the cam levers are bodily moved downwardly.

Referring to Figures 1 and 2, a male or plug member 10 has a body portion 11 which may have a polygonal exterior and a portion 12 of reduced diameter which constitutes the plug portion of said member. The plug portion 12 has its lower end 13 rounded or beveled, the purpose of which will be presently described. Spaced apart from the lower end thereof, the plug portion 12 has a curved annular groove 14 formed therein, and this groove is adapted to be engaged by and cooperate with camming means, which will presently be described. A concentric passage 15 is formed in the member 10 and forms a fluid passage therethrough. The upper end 16 of member 10 is counterbored to join the passage 15 and is provided with threads 17 adapted to be used for connecting the member 10 to a hose or other conduit, either flexible or rigid, leading to a point of use.

I do not wish to be limited to the threaded counterbore shown, as it is obvious that any means for connecting the member 10 to any device for use may be provided without departing from the spirit of the invention.

The female or socket member, generally designated by the numeral 18, has a body portion 19 with a passage 20 formed therein, the diameter of which is slightly larger than the diameter of the plug portion 12.

By making the passage slightly larger than the plug portion 12, the chances of binding when the plug member is inserted therein is eliminated, particularly in view of the fact that the plug portion has a beveled or rounded end 13 formed in the body portion 19, and oppositely disposed therein are slots 21 and 22 which communicate with the interior 20 thereof. The edges of the slot 21 are continuous with the inner edges of spaced bosses or lugs 23 and 24, and the edges of the slot 22 are continuous with the inner edges of spaced bosses or lugs 25 and 26.

The body 19 has an annular portion 27 which is larger in diameter and which has an annular groove 28 formed therein. The annular groove 28 is under-cut and has mounted therein an annular sealing ring 29, which forms a seat at the lower end of the passage 20, formed in the body 19. Below the annular portion 27, the body has a portion 30 of reduced diameter with a passage 31 formed therein, which is substantially the same diameter as and concentric with the passage 15. The exterior of the portion may, for example, carry threads 32 adapted to be engaged by a fitting on any rigid or flexible conduit leading to a point of use. The lever 33 has its upper end in the form of a boss 34, and a pin 35 forms a working fit in a hole 35a formed therein. This pin also extends through aligned holes formed in the lugs 23 and 24. The surface of the boss includes a curvilinear portion 36 with a flattening or clearance portion 37 on one side thereof and a camming portion 38 on the opposite side thereof. The action of these surfaces of the boss 34 which forms a camming member will be presently described. A lever 39 is substantially identical with the lever 33 and it has a boss 40 formed on the upper end thereof, like the boss 34 on the lever 33. A pin 41 extends through aligned holes formed in the lugs 25 and 26 and forms a bearing for the lever 39. The boss 40 has a surface 42 corresponding to the surface 37, a surface 43 corresponding to the surface 36, and a camming surface 44 corresponding to the surface 38. The lower end of the lever 33 has a hole 45 formed therein to accommodate a ring 46. Likewise, the lower end of the lever 39 has a hole 47 therethrough to accommodate a ring 48.

The positions of the members 10 and 18, when said members are coupled together, is like that shown in Fig. 1. It will be noted that the gasket 29, due to the axial pressure of the male or plug portion 12 against the gasket 29, causes it to bulge inwardly, as shown at 29a, and thereby effect a fluid tight seal between the two members 10 and 18. The levers 33 and 39 are shown as moved to positions where they exert the maximum axial pressure on the annular curved surface 14 of the plug portion 12. The camming surfaces 38 and 44 acting against the curvilinear surfaces have effected the axial forcing of the end of the portion 12 against the gasket 29. The rings 46 and 48 are provided to enable an operator to easily move the lever 33 counter-clockwise and the lever 39 clockwise to release the male or plug portion of the member 10.

When the two members of the coupling have been separated and it is desired to re-associate them in fluid tight relation, first the end of the plug member 12 is inserted into the bore 20 of the body 19 and pressed axially toward the bottom of the socket in the member 18. The rounded edge 13 first encounters the rounded portions 36 and 43 on the cams 34 and 40 so that further movement of the member 10 causes the lever 33 to swing upwardly in a counter-clockwise direction and causes the lever 39 to swing upwardly in a clockwise direction (see Fig. 3). Still further movement causes the diameter of the lower end of the portion 12 to come between the flat surfaces 37 and 42 of these cams (see Fig. 4). Further movement downwardly is freely effected due to the fact that the end of the member is between the substantially parallel flat surfaces 37 and 42.

As the member 10 is moved downwardly toward the seat, the levers remain in their greatest position of upward movement as long as the diameter of the portion 12 is between the flat portions 37 and 42. As the lower end of the portion 12 approaches the gasket 29, the rounded portions 38 and 44 engage the curved surface 14 on the member 12 (see Fig. 5), following which the levers may be manually swung downwardly, that is to say, the lever 33 is swung downwardly in a clockwise direction and the lever 39 is swung downwardly in a counter-clockwise direction, and as they are swung downwardly, the camming action of the surfaces 38 and 44 against the curvilinear surface 14 on the plug member 12, forces the member 12 axially or downwardly against the gasket 29, as seen in Fig. 5, and as the levers approach their lowest positions, the gasket is compressed and deformed inwardly, as shown at 29a in Fig. 1, and thereby a fluid tight seal is established between the lower end of the plug portion 12 and the gasket 29.

From the above description, it will be seen that my new and improved coupling has features and advantages not found in couplings of the prior art, and one of the more important features is that the male or plug member may be inserted into the socket member without having to first manually raise the levers to provide clearance. The plug member acts against the cams and provides its own clearance.

Although I have herein shown and described by way of example one embodiment of my new and improved coupling, it is obvious that many changes may be made in the arrangements herein shown and described without departing from the scope of the following claims.

What is claimed is:

In a separable coupling device, a tubular male member having one end thereof faced to form a seat and having an external annular concave groove formed thereon adjacent to said end, a female member including a tubular portion having an internal shoulder therein, a gasket on said shoulder adapted to be engaged by said end of said male member, a slot formed in the wall of said tubular portion, a cam journaled on said tubular portion and extending through said slot, said cam having a flat portion, a curvilinear portion, and an apex therebetween, said apex normally extending into the interior of said tubular portion in the path of the end of said male member when the latter is inserted into said tubular portion, whereby said cam is moved to a position where said flat portion is flush with said wall and provides clearance for said male member to be moved to bring said end into engagement with said gasket, and means for rotating said cam to cause said curvilinear portion to act against said annular groove and force said end axially into sealing engagement with said gasket.

JOHN T. KRAPP.

REFERENCES CITED

The following references are of record in the file of this patent:

UNITED STATES PATENTS

| Number | Name | Date |
|---|---|---|
| 1,261,687 | Brandon | Apr. 2, 1918 |
| 1,646,873 | Richards | Oct. 25, 1927 |
| 2,033,142 | Lewis | Mar. 10, 1936 |

FOREIGN PATENTS

| Number | Country | Date |
|---|---|---|
| 650,786 | Germany | Dec. 16, 1934 |